United States Patent
Chandramouli et al.

(10) Patent No.: US 12,317,215 B2
(45) Date of Patent: May 27, 2025

(54) METHOD, APPARATUS AND COMPUTER PROGRAM PRODUCT FOR ADAPTIVE PAGING OF USER EQUIPMENT SUPPORTING MULTIPLE SUBSCRIBER IDENTIFICATION MODULES

(71) Applicant: Nokia Technologies Oy, Espoo (FI)

(72) Inventors: Devaki Chandramouli, Plano, TX (US); Alessio Casati, Surrey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 322 days.

(21) Appl. No.: 17/765,033

(22) PCT Filed: Sep. 29, 2020

(86) PCT No.: PCT/FI2020/050636
§ 371 (c)(1),
(2) Date: Mar. 30, 2022

(87) PCT Pub. No.: WO2021/064286
PCT Pub. Date: Apr. 8, 2021

(65) Prior Publication Data
US 2022/0361134 A1 Nov. 10, 2022

Related U.S. Application Data

(60) Provisional application No. 62/908,044, filed on Sep. 30, 2019.

(51) Int. Cl.
*H04W 60/00* (2009.01)
*H04W 68/00* (2009.01)

(52) U.S. Cl.
CPC ....... *H04W 60/005* (2013.01); *H04W 68/005* (2013.01)

(58) Field of Classification Search
CPC .......................... H04W 60/005; H04W 68/005
(Continued)

(56) References Cited

U.S. PATENT DOCUMENTS

| | | |
|---|---|---|
| 9,237,550 B1 | 1/2016 | Rai et al. |
| 2002/0019241 A1 | 2/2002 | Vialen et al. |

(Continued)

FOREIGN PATENT DOCUMENTS

| | | |
|---|---|---|
| CN | 101669389 A | 3/2010 |
| CN | 103583072 A | 2/2014 |

(Continued)

OTHER PUBLICATIONS

"3rd Generation Partnership Project; Technical Specification Group Services and System Aspects; Study on system enablers for devices having multiple Universal Subscriber Identity Modules (USIM) (Release 17)", 3GPP TR 23.761 v1.2.0, (Nov. 2020), 108 pages.

(Continued)

*Primary Examiner* — Ted M Wang
(74) *Attorney, Agent, or Firm* — ALSTON & BIRD LLP

(57) ABSTRACT

A method, apparatus, and computer program product provide for adaptive paging for user equipment (UE) with multiple subscriber identification modules (SIMs). A UE may provide, in a registration message to the network, an indication that the UE supports multiple SIMs. The network may allow repeated paging to let a SIM miss a paging occasion without interpreting that the UE is unavailable. The indication from the UE can specify the number of SIMS supported by the UE. The network can adapt the number of paging repetitions to the UE. If the UE is accepting paging from another network or has a SIM that is already active with the network, the UE sends the network a paging control message. If the UE detects a paging occasion conflict, the UE sends the network a registration message with a replace- (Continued)

ment ID for paging another SIM, and the UE and the network negotiate appropriate paging.

20 Claims, 6 Drawing Sheets

(58) Field of Classification Search
USPC .................................................... 455/435.1
See application file for complete search history.

(56) References Cited

U.S. PATENT DOCUMENTS

| | | |
|---|---|---|
| 2010/0197294 A1 | 8/2010 | Fox et al. |
| 2011/0140846 A1 | 6/2011 | Blanz et al. |
| 2013/0035120 A1 | 2/2013 | Dhanda et al. |
| 2013/0303203 A1 | 11/2013 | Wang et al. |
| 2014/0248922 A1 | 9/2014 | Josso et al. |
| 2014/0274047 A1 | 9/2014 | Dhanda et al. |
| 2015/0017968 A1 | 1/2015 | Kaikkonen et al. |
| 2015/0065132 A1* | 3/2015 | Ramkumar ........... H04W 48/16 455/435.2 |
| 2015/0098445 A1 | 4/2015 | Chakravarthy et al. |
| 2016/0219648 A1 | 7/2016 | Awoniyi-Oteri et al. |
| 2017/0230932 A1 | 8/2017 | Challa et al. |
| 2018/0160422 A1 | 6/2018 | Pathak et al. |

FOREIGN PATENT DOCUMENTS

| | | |
|---|---|---|
| CN | 104869528 A | 8/2015 |
| CN | 108093089 A | 5/2018 |
| EP | 2605559 A1 | 6/2013 |
| EP | 3 914 000 A1 | 11/2021 |
| KR | 20130111860 A | 10/2013 |

OTHER PUBLICATIONS

"3rd Generation Partnership Project; Technical Specification Group Services and System Aspects; Vocabulary for 3GPP Specifications (Release 16)", 3GPP TS 21.905 v16.0.0, (Jun. 2019), 65 pages.

International Search Report and Written Opinion for Patent Cooperation Treaty Application No. PCT/FI2020/050636 dated Dec. 16, 2020, 15 pages.

Nokia et al., "Solution for Improved Paging in MUSIM Devices (KI#1,2,3)", SA WG2 Meeting #136-AH, S2-2000855, (Jan. 13-17, 2020), 7 pages.

SA WG2, "Revised SID: Study on System Enablers for Multi-SIM Devices", TSG SA Meeting #SP-83, SP-190179, (Mar. 20-22, 2019), 4 pages.

LG Electronics, "Support for paging reception for UE with Multiple Sims", 3GPP TSG-SA WG Meeting #86, S1-191073, (May 6-10, 2019), 3 pages.

Office Action for Chinese Application No. 202080082745.0 dated Feb. 29, 2024, 17 pages.

Vivo (Moderator), "Report of Phase 1 Multi-SIM Email Discussion", 3GPP TSG-RAN WG Meeting #85, RP-191898, (Sep. 16-20, 2019), 36 pages.

China Telecom, "Use Case: Handling of Service Prioritization", 3GPP TSG-SA WG1 Meeting #86, S1-191502, (May 6-10, 2019), 2 pages.

Extended European Search Report for European Application No. 20870909.7 dated Sep. 14, 2023, 14 pages.

Office Action for European Application No. 20870909.7 dated Jun. 25, 2024, 4 pages.

Office Action for European Application No. 20870909.7 dated Feb. 27, 2025, 6 pages.

* cited by examiner

METHOD, APPARATUS AND COMPUTER PROGRAM PRODUCT FOR ADAPTIVE PAGING OF USER EQUIPMENT SUPPORTING MULTIPLE SUBSCRIBER IDENTIFICATION MODULES

CROSS-REFERENCE TO RELATED APPLICATIONS

This application is a national phase entry of International Application No. PCT/FI2020/050636 filed Sep. 29, 2020 which claims priority to U.S. Provisional Patent Application No. 62/908,044 filed Sep. 30, 2019, the entire contents of both of which are incorporated herein by reference.

TECHNOLOGICAL FIELD

The subject matter described herein relates to wireless communications, and more particularly, to paging occasions for user equipment supporting multiple subscriber identification modules.

BACKGROUND

Telecommunication networks, such as the fifth generation of mobile networks (5G networks) are expected to be the next major phase of mobile telecommunication standards and to bring many improvements in mobile network user experience. For instance, 5G networks should provide new technical solutions allowing a greater throughput, lower latency, higher reliability, higher connectivity and higher mobility range. In addition to these improvements in terms of performance, 5G networks are also expected to extend the flexibility in the network usage and to allow providing users with a wider range of use cases and business models.

In wireless telecommunications, user equipment (UE), such as a smart phone or another such mobile device, can be connected to a network, such as the 5G network or the like. A UE may have one or more subscriber identity modules (SIMs), such as universal SIMs (USIMs), and can be configured to operate in a single radio or dual radio mode. Sometimes, when a UE has more than one SIM, one or more SIMs will be the active SIMs, while some or all of the remaining SIMs are in a standby mode or otherwise inactive. The network and the UE may interact at a given point in time using a single SIM associated with the UE. However, over a longer time-span, two or more SIMs, which are active during at least part of the longer time-span, can be used in independent interactions between one or more networks and the UE. As such, multi-SIM UEs are typically UEs that can allow more than one SIM to be active at the same time.

Multi-SIM UEs often receive messages with the network, e.g., by the network paging a second SIM while a first SIM is used from the set of active SIMs, which are the SIMs that are registered with a public land mobile network (PLMN). These messages may overlap in time with the activities of the SIM being used, e.g., a paging message for one SIM may collide with a paging message for another SIM or a paging occasion for another SIM.

BRIEF SUMMARY

A method, apparatus, and computer program product are disclosed for adaptive paging of user equipment supporting multiple subscriber identification modules. A user equipment (UE) may provide, in a registration message to the network, an indication that the UE supports multiple subscriber identity modules (SIMs). The network may then allow repeated paging to let a SIM miss a paging occasion without the network interpreting that the UE is unavailable. The indication from the UE can specify the number of SIMs supported by the UE. The network can adapt the number of paging repetitions to the UE. If the UE is accepting paging from a network by using a certain SIM, but the mobile terminated services it is using with other SIMs should not be needed at a certain point in time, while the UE may at any time originate data on any of the network where it is currently registered, the UE may include in a registration message to the network(s) for these SIMs an indication to stop any paging for these SIMs. If the UE detects a paging occasion conflict among SIMs, it sends the network a registration message with assistance information to avoid paging conflicts (e.g., a replacement identification (ID) used for computing paging occasions instead of the current UE Identity the network uses for paging occasion computation or any other information that can influence a change of the paging occasion computation algorithm result, as this may evolve over time or change over future radio technologies) for paging of the SIM to which the registration message is related. In other words, it is thus possible for the UE and the network negotiate appropriate paging.

According to a first embodiment, a method is provided for adaptive paging of user equipment that supports multiple SIMs. In some embodiments, the method can comprise determining a user equipment supports a plurality of SIMs in an active mode; transmitting a registration message to a network entity, said registration message comprising an indication that the user equipment supports a plurality of SIMs; receiving a number of iterations of a paging occasion associated with a network request for active connection between the user equipment and the network entity; and in an instance in which the user equipment has accepted paging on another network, and having determined the non-preemptable or high priority nature of communications on said other network, transmitting a paging control message to said network entity; or in an instance in which the user equipment supports a first SIM that is in said active mode with said network entity and the user equipment determines a second SIM will not be placed in said active mode with said network entity, transmitting said paging control message to said network entity. In some embodiments, high priority communications can refer to communications having a priority value greater than a predetermined threshold, a priority ranking that is among a top subset of a set of other communications, or the like. In some embodiments, high priority communications can refer to communications which have one or more communications types, such as a phone call, a short messaging service (SMS) text, or the like. In some embodiments, the registration message comprises an indication of the number of SIMs supported by the user equipment. In some embodiments, the network entity is a core network or a radio access network. In some embodiments, the registration message further comprises assistance information to avoid paging conflicts (e.g., an ID used for computing paging occasions instead of the current UE Identity the network uses for paging occasion computation or any other information that can influence a change of the paging occasion computation algorithm result, as this may evolve over time or change over future radio technologies) for paging at least one of the plurality of SIMs. In some embodiments, the number of iterations of the paging occasion is one and said one paging occasion is associated with said assistance information (e.g., a replacement identification). In some embodiments, the method can further comprise negotiating with the network entity regarding appropriate paging occasions.

According to a second embodiment, a method is provided for adaptive paging of user equipment that supports multiple SIMs. In some embodiments, the method can comprise determining whether a user equipment supports a plurality of SIMs in an active mode, said SIMs being operable to facilitate registration of the user equipment with a serving network; transmitting a registration message to a network entity of said serving network; in an instance in which said registration message comprises an indication that the user equipment supports only a single SIM or said registration message does not comprise an indication of a number of SIMs supported by said user equipment, receiving a single instance of a paging occasion from said network entity; and in an instance in which said registration message comprises an indication that the user equipment supports a plurality of SIMs, receiving a plurality of iterations of a paging occasion associated with a network request for active connection between the user equipment and the network entity, said number of iterations determined based at least in part on the indication that the user equipment supports a plurality of SIMs. In some embodiments, such a method can further comprise, in an instance in which the user equipment has accepted paging or is engaged in connection for data transmission or a voice call on another network, transmitting a paging control message to said network entity; or, in an instance in which the user equipment supports a first SIM that is in used in a network, where the UE is engaged in connection for data transmission or a voice call, and where such said network entity is, and the user equipment determines a second SIM will not be used as long as the UE is engaged in connection for data transmission or a voice call in said network, transmitting said paging control message to said network entity of the serving network with which the second SIM is registered. In some embodiments, said registration message comprises an indication of the number of SIMs supported by the user equipment. In some embodiments, said network entity is a core network or a radio access network. In some embodiments, said registration message further comprises assistance information to avoid paging conflicts, wherein the number of iterations of the paging occasion is determined based at least in part using said assistance information. In some embodiments, said assistance information comprises a replacement identification that is used by said network entity to compute paging occasions. In some embodiments, such a method can further comprise negotiating with the network entity regarding appropriate paging occasions.

According to a third embodiment, an apparatus can comprise at least one processor and at least one memory including computer program code. In some embodiments, the at least one memory and the computer program code can be configured to, with the at least one processor, cause the apparatus at least to: determine whether said apparatus supports a plurality of SIMs in an active mode, said SIMs being operable to facilitate registration of said apparatus with a serving network; transmit a registration message to a network entity of said serving network; in an instance in which said registration message comprises an indication that said apparatus supports only a single SIM or said registration message does not comprise an indication of a number of SIMs supported by said apparatus, receive a single instance of a paging occasion from said network entity; and in an instance in which said registration message comprises an indication that said apparatus supports a plurality of SIMs, receive a plurality of iterations of a paging occasion associated with a network request for active connection between said apparatus and the network entity, said number of iterations determined based at least in part on the indication that said apparatus supports a plurality of SIMs. In some embodiments, such an apparatus can comprise at least one memory and the computer program code that are further configured to, with the at least one processor, cause the apparatus at least to, in an instance in which said apparatus has accepted paging or is engaged in connection for data transmission or a voice call on another network, transmit a paging control message to said network entity; and, in an instance in which said apparatus supports a first SIM that is in used in a network, where the UE is engaged in connection for data transmission or a voice call or the apparatus determines a second SIM will not be used as long as the UE is engaged in connection for data transmission or a voice call in said network, transmit said paging control message to said network entity of the serving network with which the second SIM is registered. In some embodiments, said registration message comprises an indication of the number of SIMs supported by said apparatus. In some embodiments, said network entity is a core network or a radio access network. In some embodiments, said registration message further comprises assistance information to avoid paging conflicts, wherein the number of iterations of the paging occasion is determined based at least in part using said assistance information. In some embodiments, said assistance information comprises a replacement identification that is used by said network entity to compute paging occasions. In some embodiments, such an apparatus can comprise at least one memory and the computer program code that are further configured to, with the at least one processor, cause the apparatus at least to negotiate with the network entity regarding appropriate paging occasions.

According to a fourth embodiment, an apparatus can comprise means, such as at least one processor and at least one memory including computer program code, for adaptive paging of user equipment supporting multiple SIMs. In some embodiments, the apparatus can comprise means for determining whether said apparatus supports a plurality of SIMs in an active mode, said SIMs being operable to facilitate registration of said apparatus with a serving network; means for, transmitting a registration message to a network entity of said serving network; means for, in an instance in which said registration message comprises an indication that said apparatus supports only a single SIM or said registration message does not comprise an indication of a number of SIMs supported by said apparatus, receiving a single instance of a paging occasion from said network entity; and means for, in an instance in which said registration message comprises an indication that said apparatus supports a plurality of SIMs, receiving a plurality of iterations of a paging occasion associated with a network request for active connection between said apparatus and the network entity, said number of iterations determined based at least in part on the indication that said apparatus supports a plurality of SIMs. In some embodiments, the apparatus can further comprise means for, in an instance in which said apparatus has accepted paging or is engaged in connection for data transmission or a voice call on another network, transmitting a paging control message to said network entity; or means for, in an instance in which said apparatus supports a first SIM that is in use in a network, where the UE is engaged in connection for data transmission or a voice call, and where such said network entity is, and said apparatus determines a second SIM will not be used as long as the UE is engaged in connection for data transmission or a voice call in said network, transmitting said paging control message to said network entity of the serving network with which the second SIM is registered. In some embodiments, said registration message comprises an indication of the number of SIMs supported by said apparatus. In some embodiments, said network entity is a core network or a radio access network. In some embodiments, said registration message further comprises assistance information to avoid paging conflicts, wherein the number of iterations of the paging occasion is determined based at least in part upon using said assistance information. In some embodiments, said assistance information comprises a replacement ID that is used by said network entity to compute paging occasions. In some embodiments, said apparatus can further comprise means for negotiating with the network entity regarding appropriate paging occasions.

According to a fifth embodiment, a computer program product is provided for adaptive paging of a user equipment supporting multiple SIMs. In some embodiments, the computer program product can comprise a non-transitory computer readable storage medium having program code portions stored thereon. In some embodiments, the program code portions can be configured, upon execution, to: determine whether a user equipment supports a plurality of SIMs in an active mode, said SIMs being operable to facilitate registration of the user equipment with a serving network; transmit a registration message to a network entity of said serving network; in an instance in which said registration message comprises an indication that the user equipment supports only a single SIM or said registration message does not comprise an indication of a number of SIMs supported by said user equipment, receive a single instance of a paging occasion from said network entity; and in an instance in which said registration message comprises an indication that the user equipment supports a plurality of SIMs, receive a plurality of iterations of a paging occasion associated with a network request for active connection between the user equipment and the network entity, said number of iterations determined based at least in part on the indication that the user equipment supports a plurality of SIMs. In some embodiments, the program code portions are further configured, upon execution, to, in an instance in which the user equipment has accepted paging or is engaged in connection for data transmission or a voice call on another network, transmit a paging control message to said network entity; and, in an instance in which the user equipment supports a first SIM that is in used in a network, where the UE is engaged in connection for data transmission or a voice call or the apparatus determines a second SIM will not be used as long as the UE is engaged in connection for data transmission or a voice call in said network, transmit said paging control message to said network entity of the serving network with which the second SIM is registered. In some embodiments, said registration message comprises an indication of the number of SIMs supported by the user equipment. In some embodiments, said network entity is a core network or a radio access network. In some embodiments, said registration message further comprises assistance information to avoid paging conflicts, wherein the number of iterations of the paging occasion is determined based at least in part using said assistance information. In some embodiments, said assistance information comprises a replacement identification that is used by said network entity to compute paging occasions. In some embodiments, the program code portions are further configured, upon execution, to negotiate with the network entity regarding appropriate paging occasions.

According to a sixth embodiment, a method is provided for adaptive paging of a user equipment supporting multiple SIMs. In some embodiments, the method can comprise determining that a user equipment supports a plurality of SIMs in an active mode; determining there is a likelihood of a paging occasion conflict; transmitting, from said user equipment, a registration message to a network entity on a serving network, said registration message comprising an indication that said user equipment supports a plurality of SIMs and assistance information operable for computing a number of iterations of a paging occasion suitable for said user equipment; negotiating with the network entity regarding said number of iterations of said paging occasion suitable for said user equipment; and receiving, at said user equipment, said suitable number of iterations of said paging occasion from said network entity, said paging occasion associated with a network request for transfer of data or a phone call between the network entity and said user equipment.

According to a seventh embodiment, an apparatus is provided for adaptive paging of a user equipment supporting multiple SIMs. In some embodiments, the apparatus can comprise at least one processor and at least one memory including computer program code. In some embodiments, the at least one memory and the computer program code can be configured to, with the at least one processor, cause the apparatus at least to determine that said apparatus supports a plurality of SIMs in an active mode; determine there is a likelihood of a paging occasion conflict; transmit, from said apparatus, a registration message to a network entity on a serving network, said registration message comprising an indication that said apparatus supports a plurality of SIMs and assistance information operable for computing a number of iterations of a paging occasion suitable for said apparatus; negotiate with the network entity regarding said number of iterations of said paging occasion suitable for said apparatus; and receive, at said apparatus, said suitable number of iterations of said paging occasion from said network entity, said paging occasion associated with a network request for transfer of data or a phone call between the network entity and said apparatus.

According to an eighth embodiment, an apparatus is provided comprising means, such as at least one processor and at least one memory including computer program code, for adaptive paging of a user equipment supporting multiple SIMs. In some embodiments, the apparatus can comprise means for determining that said apparatus supports a plurality of SIMs in an active mode; means for determining there is a likelihood of a paging occasion conflict; means for transmitting, from said apparatus, a registration message to a network entity on a serving network, said registration message comprising an indication that said apparatus supports a plurality of SIMs and assistance information operable for computing a number of iterations of a paging occasion suitable for said apparatus; means for negotiating with the network entity regarding said number of iterations of said paging occasion suitable for said apparatus; and means for receiving, at said apparatus, said suitable number of iterations of said paging occasion from said network entity, said paging occasion associated with a network request for transfer of data or a phone call between the network entity and said apparatus.

According to a ninth embodiment, a computer program product is provided for adaptive paging of a user equipment supporting multiple SIMs. In some embodiments, the computer program product can comprise a non-transitory computer readable storage medium having program code portions stored thereon. In some embodiments, the program code portions can be configured, upon execution, to: determine that a user equipment supports a plurality of SIMs in an active mode; determine there is a likelihood of a paging occasion conflict; transmit, from said user equipment, a registration message to a network entity on a serving network, said registration message comprising an indication that said user equipment supports a plurality of SIMs and assistance information operable for computing a number of iterations of a paging occasion suitable for said user equipment; negotiate with the network entity regarding said number of iterations of said paging occasion suitable for said user equipment; and receive, at said user equipment, said suitable number of iterations of said paging occasion from said network entity, said paging occasion associated with a network request for transfer of data or a phone call between the network entity and said user equipment.

According to a tenth embodiment, a method is provided for adaptive paging of a user equipment supporting multiple SIMs. In some embodiments, the method can comprise receiving, from a user equipment, a registration message; determining whether said registration message comprises an indication that said user equipment supports a plurality of SIMs; in an instance in which said registration message comprises an indication that said user equipment supports only a single SIM or said registration message does not comprise an indication of a number of SIMs supported by said user equipment, determining it is suitable to send paging occasions only a single time to said user equipment; and, in an instance in which said registration message comprises an indication that said user equipment supports a plurality of SIMs, determining it is suitable to send a plurality of iterations of paging occasions to said user equipment. In some embodiments, said registration message further comprises an indication of a number of SIMs supported by said user equipment. In some embodiments, the method further comprises determining a number of iterations of paging occasions that is suitable to send to said user equipment, based at least in part upon said indication of said number of SIMs supported by said user equipment. In some embodiments, the method further comprises receiving, from said user equipment, a paging control message; and upon receiving said paging control message, sending paging occasions to said user equipment according to said paging control message or discontinuing sending paging occasions to said user equipment. In some embodiments, said registration message further comprises supporting information regarding said SIMs supported by said user equipment. In some embodiments, said supporting information comprises a replacement identification. In some embodiments, the method further comprises, in an instance in which said registration message comprises an indication that said user equipment supports a plurality of SIMs, sending said plurality of iterations of a paging occasion to said user equipment, said paging occasion associated with a network request for transfer of data or a phone call between the network entity and said user equipment.

According to an eleventh embodiment, an apparatus is provided for adaptive paging of a user equipment supporting multiple SIMs. The apparatus can comprise at least one processor and at least one memory including computer program code. In some embodiments, the at least one memory and the computer program code can be configured to, with the at least one processor, cause the apparatus at least to: receive, from a user equipment, a registration message; determine whether said registration message comprises an indication that said user equipment supports a plurality of SIMs; in an instance in which said registration message comprises an indication that said user equipment supports only a single SIM or said registration message does not comprise an indication of a number of SIMs supported by said user equipment, determine it is suitable to send paging occasions only a single time to said user equipment; and, in an instance in which said registration message comprises an indication that said user equipment supports a plurality of SIMs, determine it is suitable to send a plurality of iterations of paging occasions to said user equipment. In some embodiments, said registration message further comprises an indication of a number of SIMs supported by said user equipment. In some embodiments, the at least one memory and the computer program code are further configured to, with the at least one processor, cause the apparatus at least to: determine a number of iterations of paging occasions that is suitable to send to said user equipment, based at least in part upon said indication of said number of SIMs supported by said user equipment. In some embodiments, the at least one memory and the computer program code are further configured to, with the at least one processor, cause the apparatus at least to: receive, from said user equipment, a paging control message; and upon receiving said paging control message, send paging occasions to said user equipment according to said paging control message or discontinue sending paging occasions to said user equipment. In some embodiments, said registration message further comprises supporting information regarding said SIMs supported by said user equipment. In some embodiments, said supporting information comprises a replacement identification. In some embodiments, the at least one memory and the computer program code are further configured to, with the at least one processor, cause the apparatus at least to, in an instance in which said registration message comprises an indication that said user equipment supports a plurality of SIMs, send said plurality of iterations of a paging occasion to said user equipment, said paging occasion associated with a network request for transfer of data or a phone call between said apparatus and said user equipment.

According to a twelfth embodiment, an apparatus is provided for adaptive paging of a user equipment supporting multiple SIMs. In some embodiments, the apparatus can comprise means, such as at least one processor and at least one memory including computer program code. In some embodiments, the apparatus can comprise means for receiving, from a user equipment, a registration message; means for determining whether said registration message comprises an indication that said user equipment supports a plurality of SIMs; means for, in an instance in which said registration message comprises an indication that said user equipment supports only a single SIM or said registration message does not comprise an indication of a number of SIMs supported by said user equipment, determining it is suitable to send paging occasions only a single time to said user equipment; and means for, in an instance in which said registration message comprises an indication that said user equipment supports a plurality of SIMs, determining it is suitable to send a plurality of iterations of paging occasions to said user equipment. In some embodiments, said registration message further comprises an indication of a number of SIMs supported by said user equipment. In some embodiments, the apparatus further comprises means for determining a number of iterations of paging occasions that is suitable to send to said user equipment, based at least in part upon said indication of said number of SIMs supported by said user equipment. In some embodiments, the apparatus further comprises means for receiving, from said user equipment, a paging control message; and means for, upon receiving said paging control message, sending paging occasions to said user equipment according to said paging control message or discontinuing sending paging occasions to said user equipment. In some embodiments, said registration message further comprises supporting information regarding said SIMs supported by said user equipment. In some embodiments, said supporting information comprises a replacement identification. In some embodiments, the apparatus can further comprise means for, in an instance in which said registration message comprises an indication that said user equipment supports a plurality of SIMs, sending said plurality of iterations of a paging occasion to said user equipment, said paging occasion associated with a network request for transfer of data or a phone call between said apparatus and said user equipment.

According to a thirteenth embodiment, a computer program product can comprise a non-transitory computer readable storage medium having program code portions stored thereon. In some embodiments, the program code portions can be configured, upon execution, to receive, from a user equipment, a registration message; determine whether said registration message comprises an indication that said user equipment supports a plurality of SIMs; in an instance in which said registration message comprises an indication that said user equipment supports only a single SIM or said registration message does not comprise an indication of a number of SIMs supported by said user equipment, determine it is suitable to send paging occasions a single time to said user equipment; and, in an instance in which said registration message comprises an indication that said user equipment supports a plurality of SIMs, determine it is suitable to send a plurality of iterations of paging occasions to said user equipment. In some embodiments, said registration message further comprises an indication of a number of SIMs supported by said user equipment. In some embodiments, the program code portions are further configured, upon execution, to: determine a number of iterations of paging occasions that is suitable to send to said user equipment, based at least in part upon said indication of said number of SIMs supported by said user equipment. In some embodiments, the program code portions are further configured, upon execution, to: receive, from said user equipment, a paging control message; and upon receiving said paging control message, send paging occasions to said user equipment according to said paging control message or discontinue sending said number of iterations of said paging occasion associated with said network request for active connection between said user equipment and the network entity. In some embodiments, said registration message further comprises supporting information regarding said SIMs supported by said user equipment. In some embodiments, said supporting information comprises a replacement identification. In some embodiments, the program code portions are further configured, upon execution, to: in an instance in which said registration message comprises an indication that said user equipment supports a plurality of SIMs, send said plurality of iterations of a paging occasion to said user equipment, said paging occasion associated with a network request for transfer of data or a phone call between the network entity and said user equipment.

According to a fourteenth embodiment, a method is provided for adaptive paging of a user equipment supporting multiple SIMs. The method can comprise receiving, from a user equipment, a registration message comprising (i) an indication that said user equipment supports a plurality of SIMs and (ii) supporting information; negotiating with said user equipment regarding a suitable number of times for transmitting paging occasions based at least in part upon said indication that said user equipment supports a plurality of SIMs and said supporting information; and transmitting, said suitable number of times, a paging occasion associated with a network request, said network request comprising a request for data transfer to said user equipment or a request for transferring a phone call to said user equipment. In some embodiments, said registration message received from said user equipment further comprises an indication of a number of SIMs supported by said user equipment.

According to a fifteenth embodiment, an apparatus is provided for adaptive paging of a user equipment supporting multiple SIMs. The apparatus can comprise at least one processor and at least one memory including computer program code. In some embodiments, the at least one memory and the computer program code are configured to, with the at least one processor, cause the apparatus at least to: receive, from a user equipment, a registration message comprising an indication that said user equipment supports a plurality of SIMs and supporting information; negotiate with said user equipment regarding a suitable number of times for transmitting paging occasions based at least in part upon said indication that said user equipment supports a plurality of SIMs and said supporting information; and transmit, said suitable number of times, a paging occasion associated with a network request, said network request comprising a request for data transfer to said user equipment or a request for transferring a phone call to said user equipment. In some embodiments, said registration message received from said user equipment further comprises an indication of a number of SIMs supported by said user equipment.

According to a sixteenth embodiment, an apparatus is provided, comprising means such as at least one processor and at least one memory including computer program code. In some embodiments, the apparatus can comprise means for receiving, from a user equipment, a registration message comprising (i) an indication that said user equipment supports a plurality of SIMs and (ii) supporting information; means for negotiating with said user equipment regarding a suitable number of times for transmitting paging occasions based at least in part upon said indication that said user equipment supports a plurality of SIMs and said supporting information; and means for transmitting, said suitable number of times, a paging occasion associated with a network request, said network request comprising a request for data transfer to said user equipment or a request for transferring a phone call to said user equipment. In some embodiments, said registration message received from said user equipment further comprises an indication of a number of SIMs supported by said user equipment.

According to a seventeenth embodiment, a computer program product is provided for adaptive paging of a user equipment supporting multiple SIMs. In some embodiments, the computer program product can comprise a non-transitory computer readable storage medium having program code portions stored thereon. In some embodiments, the program code portions can be configured, upon execution, to receive, from a user equipment, a registration message comprising an indication that said user equipment supports a plurality of SIMs and supporting information; negotiate with said user equipment regarding a suitable number of times for transmitting paging occasions based at least in part upon said indication that said user equipment supports a plurality of SIMs and said supporting information; and transmit, said suitable number of times, a paging occasion associated with a network request, said network request comprising a request for data transfer to said user equipment or a request for transferring a phone call to said user equipment. In some embodiments, said registration message received from said user equipment further comprises an indication of a number of SIMs supported by said user equipment.

BRIEF DESCRIPTION OF THE DRAWINGS

Figure 1:
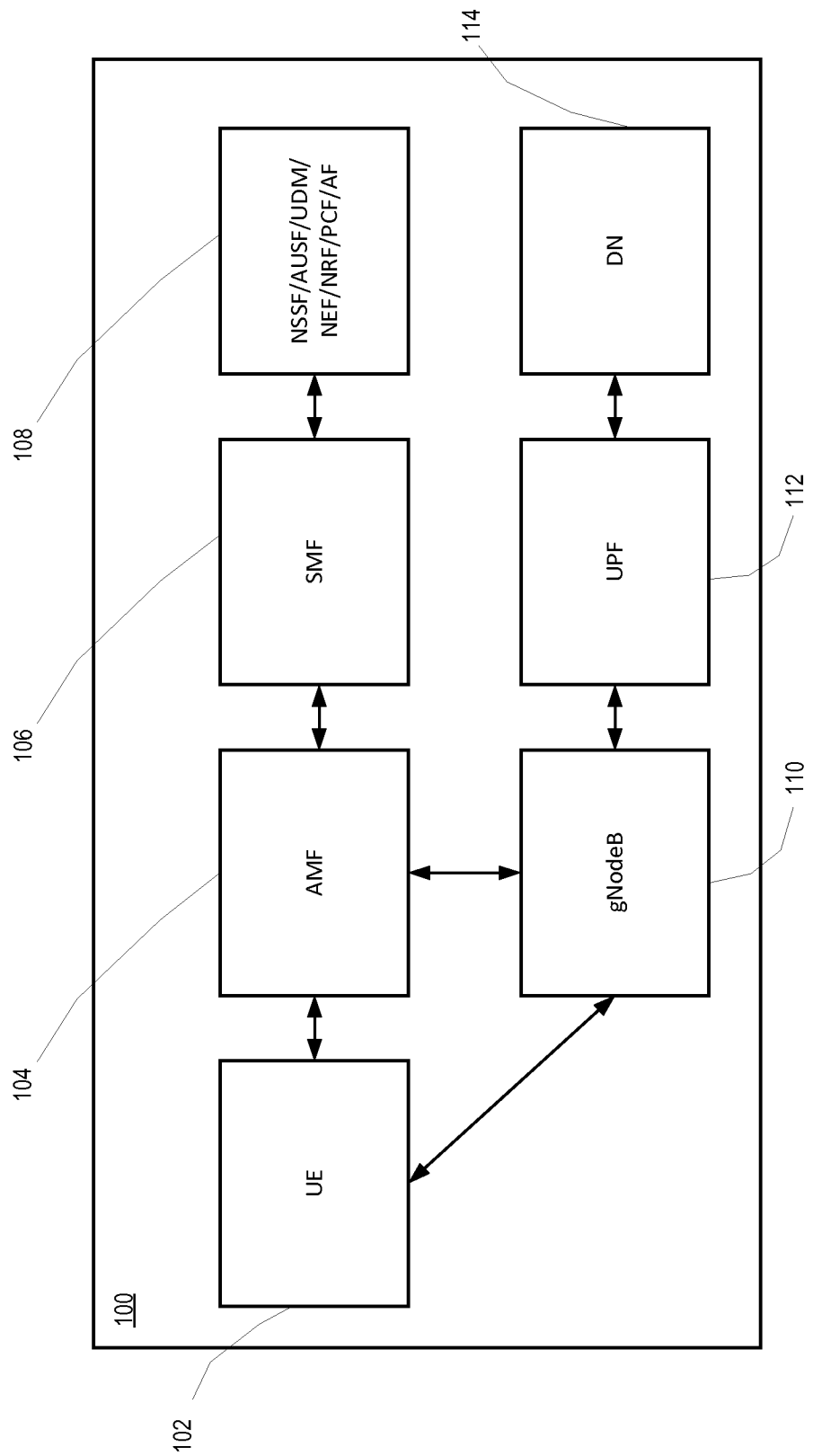
Figure 2:
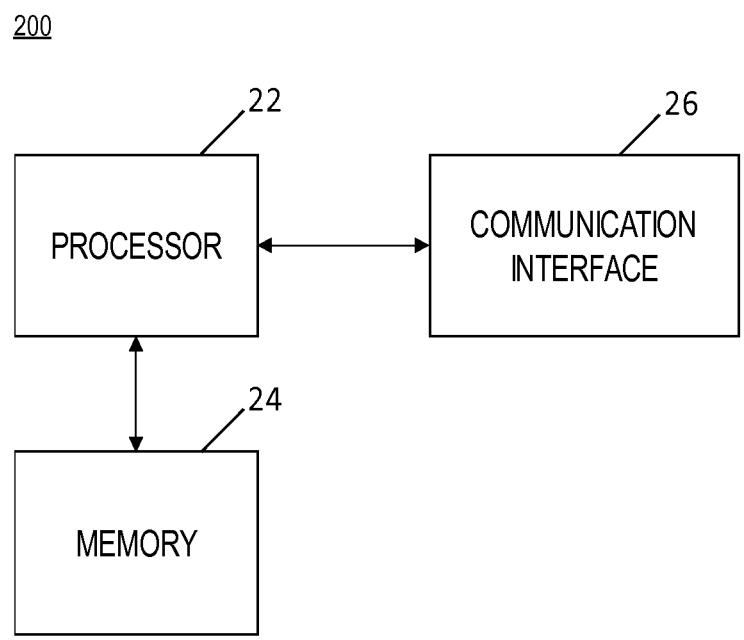
Figure 3:
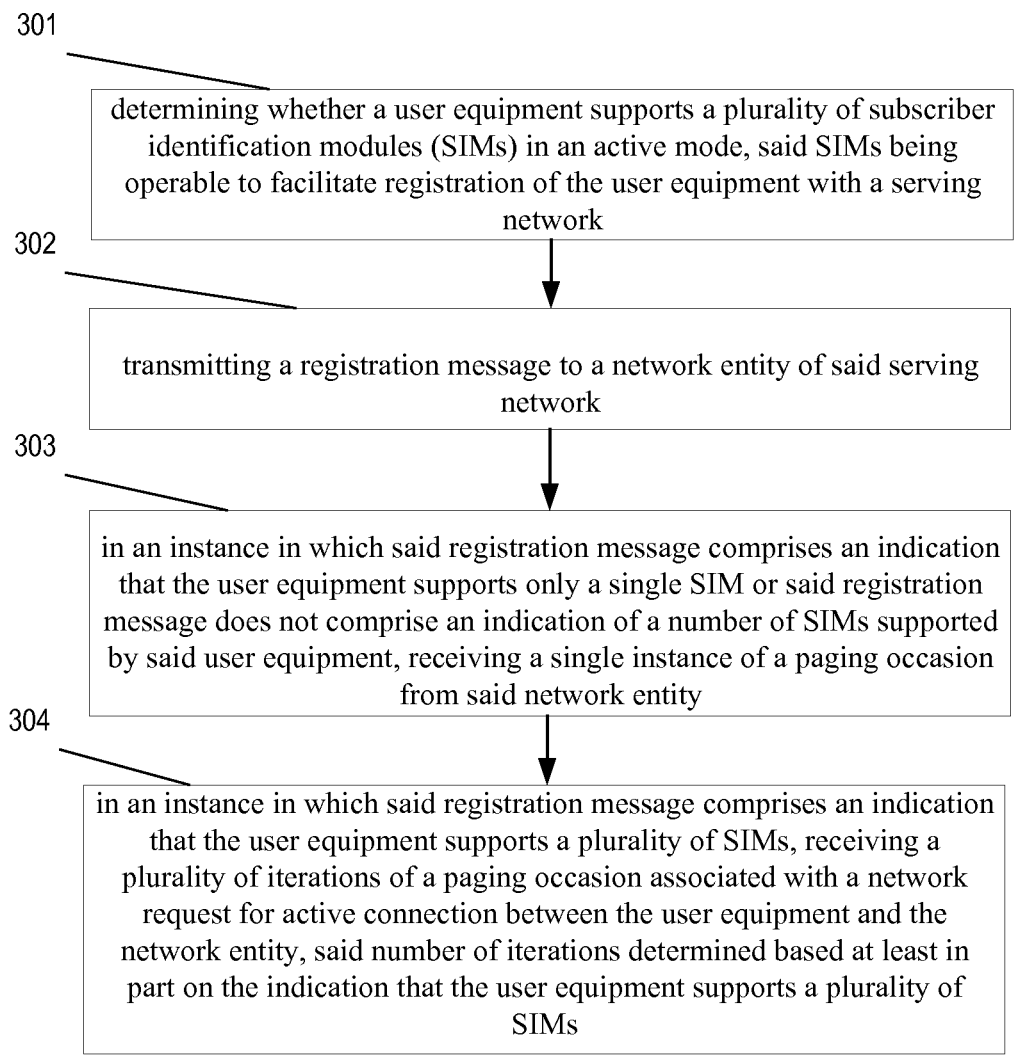
Figure 4:
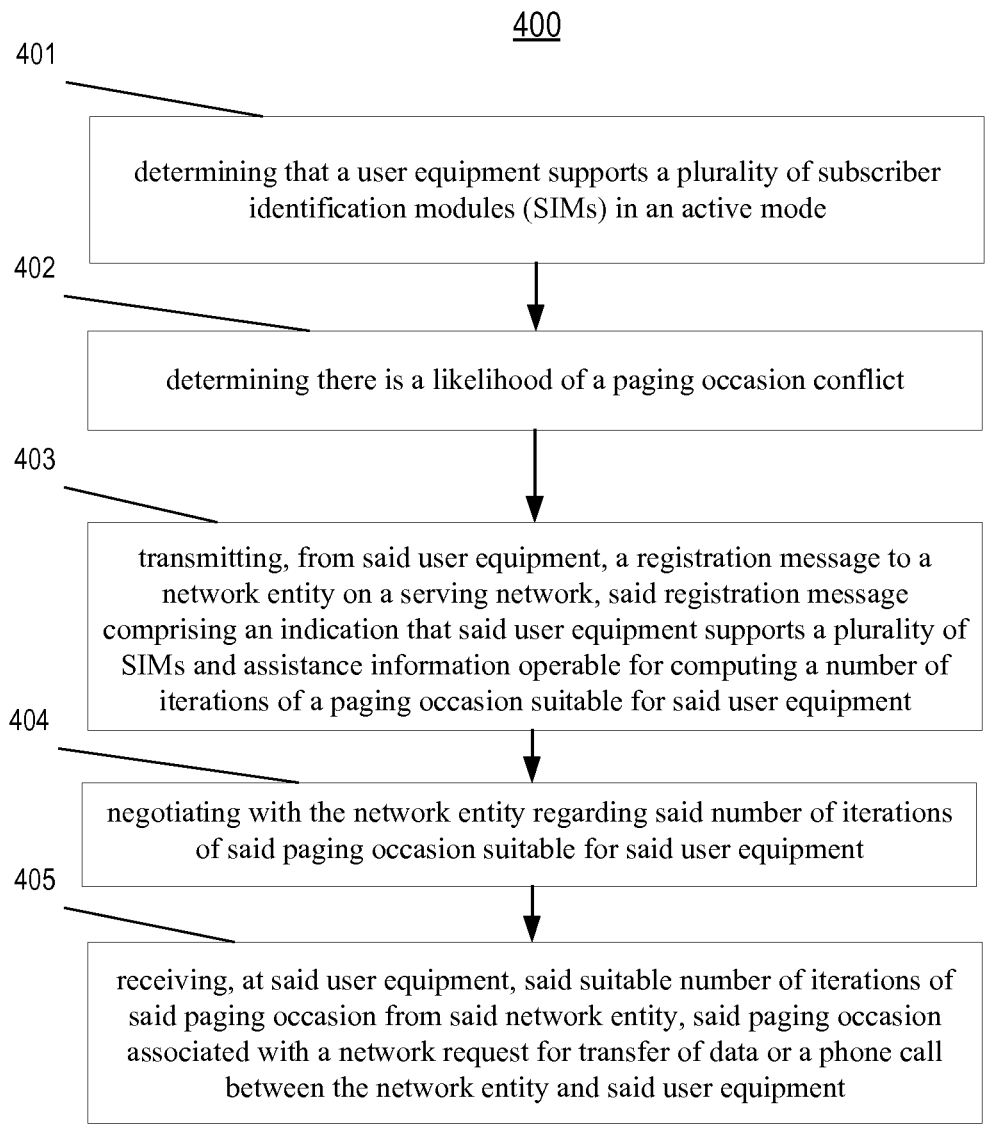
Figure 5:
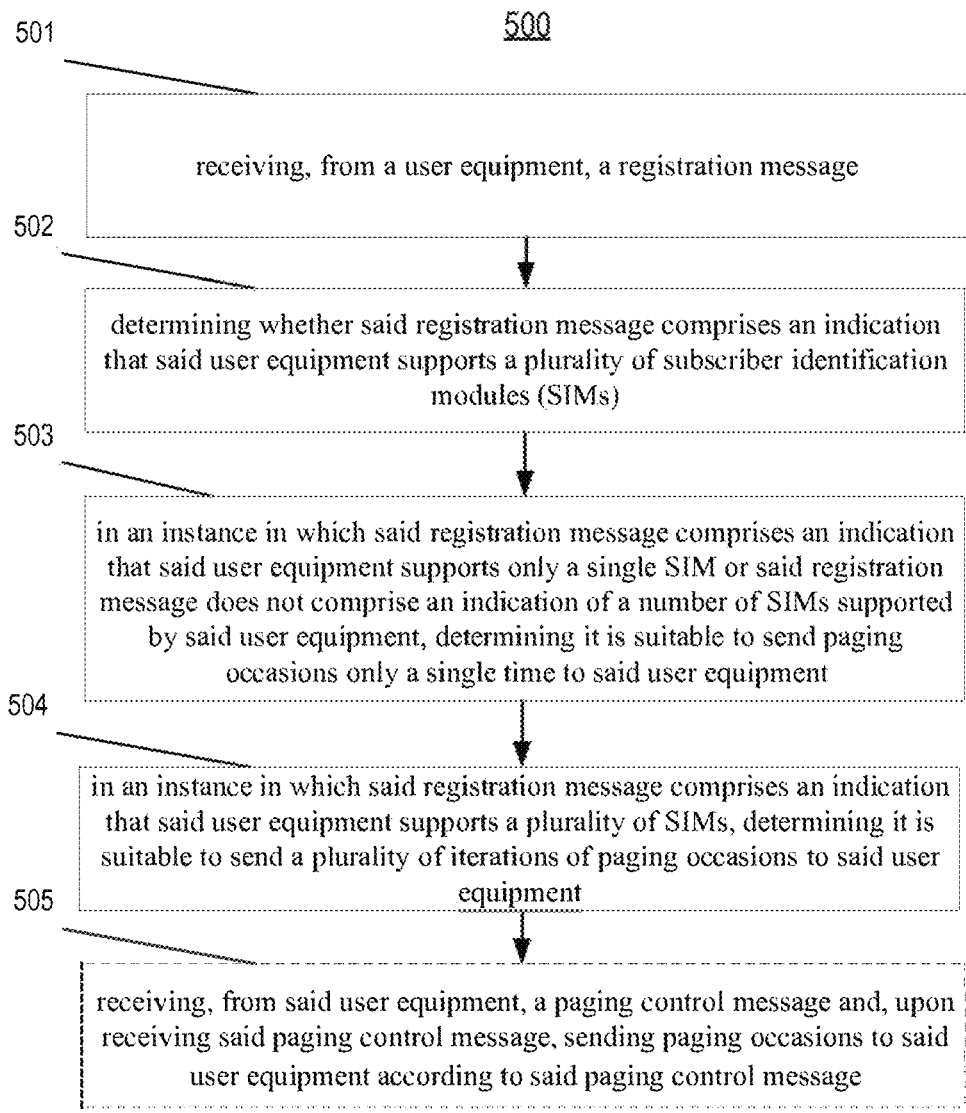
Figure 6:
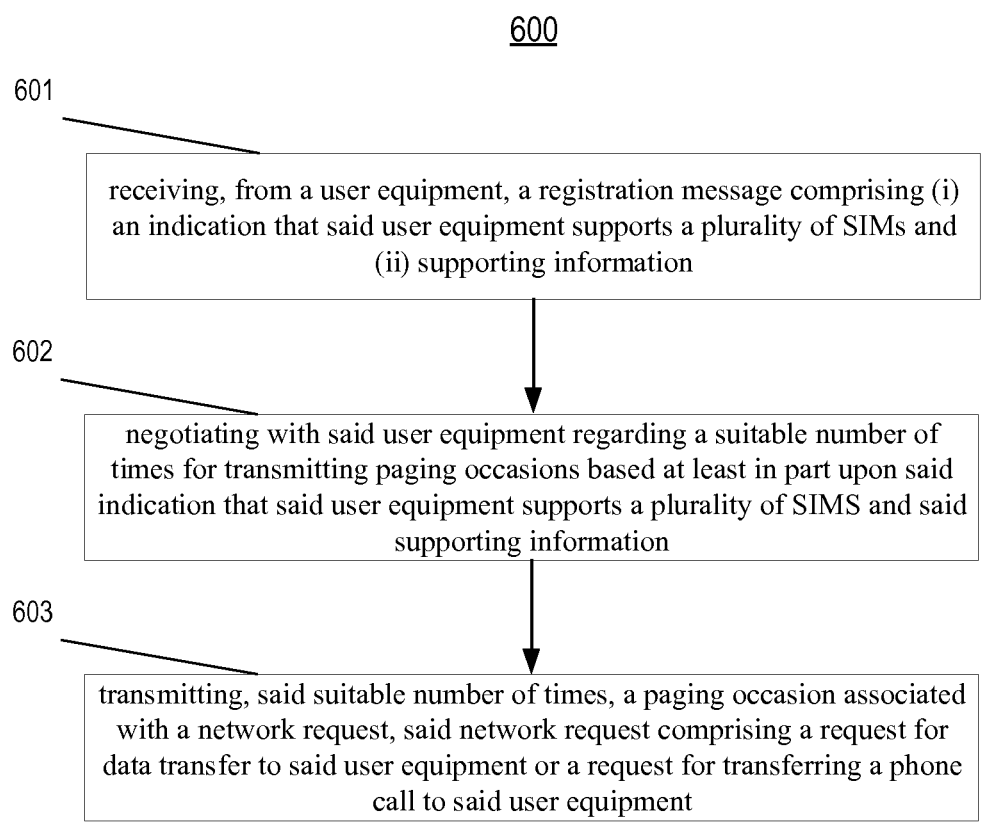

Having thus described certain example embodiments of the present disclosure in general terms, reference will hereinafter be made to the accompanying drawings, which are not necessarily drawn to scale, and wherein:

FIG. 1 is a block diagram of an example network configuration in accordance with an example embodiment of the present disclosure;

FIG. 2 is a block diagram of an apparatus that may be specifically configured in accordance with an example embodiment of the present disclosure;

FIG. 3 is a flow chart illustrating the operations performed in accordance with an example embodiment of the present disclosure;

FIG. 4 is a flow chart illustrating the operations performed in accordance with an example embodiment of the present disclosure;

FIG. 5 is a flow chart illustrating the operations performed in accordance with an example embodiment of the present disclosure; and FIG. 6 is a flow chart illustrating the operations performed in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Additionally, as used herein, the term 'module' refers to hardware or a combination of hardware and software in which the execution of the software directs operation of the hardware.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Traditionally, and prior to fifth-generation (5G) systems, UE, such as a multi-SIM devices might include a first SIM configured for a $3^{rd}$ Generation Partnership Project (3GPP)/3GPP2 network connection and an International Mobile Equipment Identifier (IMEI) chip. In other conventional approaches, a first SIM can be configured for a 3GPP network connection and a second SIM can be configured for a non-3GPP network connection, and the UE is configured to activate only one of the first SIM and the second SIM at any one time. For instance, the first SIM may be connected to a Radio Access Network (RAN) layer of a 3GPP core network (CN) or may connected to the 3GPP CN without being connected to a RAN layer, while the second SIM is in idle mode.

When a multi-SIM UE is connected to a network, the network can page the UE generally or a particular SIM stored at the UE to indicate that the network is attempting to deliver to the UE a message (e.g., an SMS message), a phone call, a data transfer, media content, a notification, or the like. In some embodiments, "paging" can refer to one-to-one communication between a base station of the network and the UE. Paging can be carried out to activate an idle SIM for transfer of such messages, data, calls, or the like to the UE while an active SIM is already being used to connect the UE to the network, which can create conflicts or overlaps in how the UE connects to and communicates with the network (e.g., through a base station of the network).

According to other conventional approaches, a network may provide a paging cause when transmitting a paging occasion to a UE, which the UE may use to determine whether to respond to the paging occasion. However, a disadvantage to this approach is that the network often must waste resources unnecessarily paging the UE and the UE is able to determine not to respond to select paging messages, which means that the network does not know whether the UE is unavailable or simply not responding.

According to still other conventional approaches, a UE may tune away from one radio to another radio periodically. However, if the UE behaves according to this strategy when it supports single radio dual registration, all the message type (MT) transactions are impacted and user experience can also be poor as the UE will likely experience a delay in receiving MT services (e.g., due to delayed traffic, delayed paging, and/or the like), since the UE often has switched to the wrong radio when the network is transmitting packets or performing paging to a different radio. Said another way, by switching between the two or more SIMs, there is an equal chance for every packet or paging occasion that is sent to the UE that the UE will simply miss the packet or paging occasion because the wrong SIM is activated.

Thus, there is a need for an approach that provides for adaptive paging of multi-SIM devices to accommodate instances in which the network or a network entity thereof transmits a paging occasion to a particular SIM of the UE.

According to some embodiments described in more detail herein, a method, apparatus, and computer program product are provided for adaptive paging for a UE with multiple SIMs/USIMs. According to one embodiment, in a registration message from the UE to the network, the UE provides an indication to the network that the UE is supporting multiple SIMs/USIMs, thereby allowing the network (e.g., Public Land Mobile Network [PLMN]) to allow for more paging repetitions to let a SIM/USIM miss a paging occasion. In some embodiments, the indication may include the number of currently active SIMs/USIMs supported by the UE to allow the network to adapt the number of paging repetitions allowed to the particular UE configuration and the number of concurrently active SIMs/USIMs supported by the UE. In some embodiments, in an instance in which the UE has accepted paging on another network or the UE has one network SIM/USIM active and does not intend to become active with the network using a second SIM/USIM, the UE may provide to the network a paging control message. In some embodiments, in an instance in which the UE detects there is a paging occasion conflict, the UE may send to the network a registration message comprising a replacement ID for paging for one of the other SIMs/USIMs so the UE and the network can coordinate more appropriate paging occasions.

In some embodiments, the UE may send the network or a network entity the paging control message at any time with or without waiting for an incoming paging message. In some embodiments, a paging control message may be included in an initial registration request message such that the UE can manage paging preferences with the network at the time of registration of the UE with the network. In some embodiments, the paging control message can comprise assistance information that is operable to allow the network to send paging to the UE regardless of paging preferences for particular type of services. For instance, the UE may indicate to the network that no paging is allowed from the network unless a paging occasion is paging related to an incoming phone call, an SMS message, and/or the like. By way of example only, a UE may send a paging control message to the network at any time indicating that one SIM/USIM is enabled for receiving android notifications while the other SIM/USIM is enabled only for internet protocol (IP) multimedia subsystem (IMS) voice. In other words, the paging control message can be used to stop paging, stop paging with particular or selective rules for when paging should be carried out, or set up service-specific paging rules, and/or the like.

While many embodiments and examples provided herein refer to SIM or Universal SIM (USIM), embodiments are also contemplated in which a UE comprises a Universal Integrated Circuit Card (UICC) containing a SIM application or USIM application.

An example embodiment herein provides methods to manage the UE's camping pattern when the UE supports single radio or dual radio, in order to facilitate the UE's needs on high priority activity and help the network avoid paging occasions that interrupt high priority activity. An example embodiment herein also provides methods for determining and/or establishing a predictable pattern of camping behavior to facilitate predictable MT communication patterns and avoid wasteful use of network resources. In some embodiments, high priority communications can refer to communications having a priority value greater than a predetermined threshold, a priority ranking that is among a top subset of a set of other communications, or the like. In some embodiments, high priority communications can refer to communications which have one or more communications types, such as a phone call, an SMS text, or the like.

According to some embodiments, the UE transmits to the network an indication that the UE supports multiple SIMs, USIMs, or the like. This allows the network (e.g., a PLMN)

to allow for repetitions to let a SIM miss a paging occasion. For instance, a UE may perform a time division multiplexing (TDM) policy to listen to paging occasions for different SIMs. In some embodiments, the indication that the UE supports multiple SIMs, USIMs, or the like can be provided in a registration request message sent to the network. In some embodiments, the indication may include the number of currently active SIMs supported by the UE. In some embodiments, the network or an entity thereof may determine a number of repetitions of a paging occasion that is allowed to be transmitted to a UE based on, at least in part, the number of currently active SIMs supported by the UE. Said another way, the network, upon receiving a registration request from a UE, can determine from the registration request how many SIMs are supported on the UE and fine tune how many iterations of the paging message are transmitted to the UE upon determination by the network of a paging occasion associated with the UE or a SIM thereof. Then, when the network transmits a paging occasion to the UE, the network may repeat sending of the paging occasion an adapted number of times customized for the particular UE. In some embodiments, the repetitions of paging occasions may be from the core network and/or a RAN level. In some embodiments, the UE can also provide to networks a paging control message if it has accepted paging on another network or if the UE is active on one network SIM and does not intend to become active with another SIM supported by the UE. By way of example only, reducing unnecessary paging can reduce wasted network resources. Furthermore, reducing the likelihood of overlapping or contradictory paging occasions can reduce the computational complexity and time required for paging between the network and the UE. Another benefit of the described approach is that the network is less likely to incorrectly determine a UE is unavailable based upon an unanswered paging occasion because the network pages all supported SIMs of the UE instead of just inactive SIMs or SIMs occupied in higher priority communications with the same network or another network.

In some embodiments, another potential improvement of this approach over the conventional approaches is that it does not require as many repetitions of the paging occasion because, if the UE detects there is a likelihood of a paging occasion conflict, the UE can report in a registration message that there is a potential for paging occasion conflict and can include a replacement ID for paging for one of the SIMS so that the UE and the network can connect and negotiate appropriate paging occasions. In some embodiments, this sort of communications between the UE and the network to negotiate more appropriate paging occasions can be sent to the non-access stratum (NAS) layer. In some embodiments, this approach can be at least partially combined with the approach above in which the UE provides an indication that a plurality of SIMs are supported by the UE, that the network can tailor iterations of paging occasions based upon the number of SIMs supported by the UE, and that the UE can send a paging control message for some or all of the reasons discussed above.

Further benefits of these approaches can include that the network has increased control over the UE's behavior and activity in the case of dual registration/multi-SIM support, irrespective of whether the UE supports a single radio or dual radio. In some embodiments, the approach can have an added benefit of avoiding the trial and error paging approach used in conventional approaches, increasing the reachability of the UE by the network. In some embodiments, the approach also avoids the trial and error MT packet delivery, when the UE supports a single radio or dual radio communications, that is typically required by conventional approaches.

In some embodiments, the apparatus, methods, and computer program product described herein can be configured for UEs that can have a plurality of idle or inactive SIMs, UEs that have one or more SIMs connected to a network and one or more other SIMs that are idle or inactive, and/or UEs that can have a plurality of SIMs that are connected to one or more networks (e.g., in the case of multiple receivers and/or receive signals and at least one transmitters and/or transmission signals).

In some embodiments, an approach can comprise a mechanism for managing a UE's camping pattern when it supports a single radio and/or dual radio, in order to facilitate its needs on high priority activity, avoid paging interrupting high priority activity. In some embodiments, for a single radio or dual radio UE with dual registration capability, a mechanism is described herein for determining a predictable pattern of camping behavior to facilitate predictable message type (MT) communication patterns and avoid wasteful use of network resources.

FIG. 1 depicts an example of a portion of a 5G wireless network 100 deployed in accordance with some example embodiments. The 5G wireless network 100 may include a user equipment 102 configured to be wirelessly coupled to the RAN (also called a core network) being served by a wireless access point, such as a gNodeB 110, which may comprise a base station, a wireless local area network access point, a home base station, and/or other types of wireless access points. The user equipment 102 may comprise a Subscriber ID (such as a UICC, SIM, USIM, or the like) which may store information elements related to a mobile subscriber.

The network 100 may include the core network, which may include a core access and mobility management function (AMF) 104. The user equipment 102 may be coupled to the AMF 104 in addition to or instead of the gNodeB 110. The AMF 104 may be used for various network tasks such as registration management, connection management, reachability management, mobility management, and/or other various functions relating to security and access management and authorization. The network 100 and/or core network may further include a session management function (SMF) 106, and various other functions (such as a policy control function [PCF], a network slice selection function [NSSF], an authentication server function [AUSF], a unified data function [UDM], a network exposure function [NEF], a network repository function [NRF], and/or an application function [AF]) 108. The network 100 may further comprise a user plane function (UPF) 112 connected to a data network (DN) 114. In some embodiments, the network 100 may comprise a standalone non-public network (SNPN), a public land mobile network (PLMN), and/or the like.

In some embodiments, the network 100 may include devices having functions supporting a home public land mobile network (HPLMN) and corresponding functions for "home" wireless local area network (WLAN) access, offloading, and/or non-3GPP access. These devices may include a UDM module, a unified data repository, an over-the-air function (OTAF) module, and/or other features such as a home SMF, a home PCF, a home NSSF, an AUSF, an AF, a home UPF (H-UPF), a DN, and/or the like.

In the depicted embodiment of FIG. 1, the OTAF, UDR, and/or UDM may be configured within the network 100 to be a standalone network function comprising an integrated secure packet library and to provide configuration service logic and one or more application programming interfaces (APIs). The UDM module and the OTAF module may be configured to access and/or communicate with each other via a $N_{OTAF}$ API. In this regard, the UDM module may access a secure packet library of the over-the-air function module via one or more commands associated with the $N_{OTAF}$ API.

One example of an apparatus 200 that may be configured to function as and/or be embodied by the UE 102, AMF 104, SMF 106, gNodeB 110, UPF 112, DN 114, or other network functions 108 such as the NSSF, AUSF, UDM, NEF, NRF, PCF, AF and/or the like is depicted in FIG. 2. As shown in FIG. 2, the apparatus 200 includes, is associated with or is in communication with processing circuitry 22, a memory 24 and a communication interface 26.

Illustrated in FIG. 2 is one possible example of an apparatus 200 for carrying out the methods, processes, and approaches described herein. It will be appreciated that the apparatus 200 is provided as an example of one embodiment and should not be construed to narrow the scope or spirit of the invention in any way. In this regard, the scope of the disclosure encompasses many potential embodiments in addition to those illustrated and described herein. As such, while FIG. 2 illustrates one example of a configuration of an apparatus for adaptive paging of multi-SIM devices in a wireless communication system, such as a 5G system, other configurations may also be used to implement certain embodiments of the present disclosure.

The apparatus 200 may be embodied as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In some example embodiments, the apparatus 200 is embodied as a mobile computing device, such as mobile telephones, mobile computers, personal digital assistants (PDAs), pagers, laptop computers, desktop computers, gaming devices, televisions, e-papers, and other types of electronic systems, which may employ various embodiments of the invention.

The apparatus 200 can comprise a processor 22, e.g., processing circuitry, and storage or a memory device 24, such as a non-volatile memory and/or volatile memory. In some embodiments, the processor 22 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 22 comprises a plurality of processors. These signals sent and received by the processor 22 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, fifth-generation (5G), Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from an embodiment of this invention, as should dual or higher mode phones (e.g., digital/analog or TDMA/CDMA/analog phones). Additionally, the apparatus 200 or a component thereof may be capable of operating according to Wi-Fi or Worldwide Interoperability for Microwave Access (WiMAX) protocols.

It is understood that the processor 22 may comprise circuitry for implementing audio/video and logic functions of the apparatus 200. For example, the processor 22 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC), an internal data modem (DM), and/or the like. Further, the processor may comprise functionality to operate one or more software programs, which may be stored in memory. For example, the processor 22 may be capable of operating a connectivity program, such as a web browser. The connectivity program may allow the apparatus 200 to transmit and receive web content, such as location-based content, according to a protocol, such as Wireless Application Protocol (WAP), hypertext transfer protocol (HTTP), and/or the like. The apparatus 200 may be capable of using a Transmission Control Protocol/Internet Protocol (TCP/IP) to transmit and receive web content across the internet or other networks.

The apparatus 200 may comprise memory 24, such as the non-volatile memory and/or the volatile memory, such as RAM, read only memory (ROM), non-volatile RAM (NVRAM), a subscriber identity module (SIM), a removable user identity module (R-UIM), and/or the like. In addition to the memory, the apparatus 200 may comprise other removable and/or fixed memory. In some embodiments, the volatile memory may include Random Access Memory (RAM) including dynamic and/or static RAM, on-chip or off-chip cache memory, and/or the like. In some embodiments, the non-volatile memory, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like the volatile memory, the non-volatile memory may include a cache area for temporary storage of data. The memory 24 may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the apparatus 200.

The apparatus 200 may also comprise a communication interface 26 including, for example, an earphone, speaker, a ringer, a microphone, a user display, a user input interface, and/or the like, which may be operationally coupled to the processor 22. In this regard, the processor 22 may comprise user interface circuitry configured to control at least some functions of one or more elements of the user interface, such as, for example, the speaker, the ringer, the microphone, the display, and/or the like. The processor 22 and/or user interface circuitry comprising the processor 22 may be configured to control one or more functions of one or more elements of the user interface through computer program instructions (e.g., software and/or firmware) stored on a memory 24 accessible to the processor 22 (e.g., non-volatile memory, volatile memory, and/or the like). Although not shown, the apparatus 200 may comprise a battery for powering various circuits related to the apparatus 200, for example, a circuit to provide mechanical vibration as a detectable output. The apparatus 200 can further comprise a display. In some embodiments, the display may be of any type appropriate for the electronic device in question with some examples including a plasma display panel (PDP), a liquid crystal display (LCD), a light-emitting diode (LED), an organic light-emitting diode display (OLED), a projector, a holographic display, or the like. The user interface 26 may comprise devices allowing the apparatus 200 to receive data, such as a keypad, a touch display (e.g., some example embodiments wherein the display is configured as a touch display), a joystick (not shown), and/or other input device. In embodiments including a keypad, the keypad may comprise numeric (0-9) and related keys (#, *), and/or other keys for operating the apparatus 100.

In some embodiments, the communication interface 26 may be embodied as any device or means embodied in circuitry, hardware, a computer program product comprising computer readable program instructions stored on a computer readable medium (e.g., the memory 24) and executed by a processing device (e.g., the processor 22), or a combination thereof that is configured to receive and/or transmit data from/to another computing device. In some example embodiments, the communication interface 26 is at least partially embodied as or otherwise controlled by the processor 22. In this regard, the communication interface 26 may be in communication with the processor 22, such as via a bus. The communication interface 26 may include, for example, an antenna, a transmitter, a receiver, a transceiver and/or supporting hardware or software for enabling communications with one or more remote computing devices. In embodiments wherein the apparatus 200 is embodied as an apparatus 200, the communication interface 26 may be embodied as or comprise the transmitter and the receiver. The communication interface 26 may be configured to receive and/or transmit data using any protocol that may be used for communications between computing devices. In this regard, the communication interface 26 may be configured to receive and/or transmit data using any protocol that may be used for transmission of data over a wireless network, wireline network, some combination thereof, or the like by which the apparatus 200 and one or more computing devices may be in communication. As an example, the communication interface 26 may be configured to receive and/or otherwise access content (e.g., web page content, streaming media content, and/or the like) over a network from a server or other content source. The communication interface 26 may additionally be in communication with the memory 24 and/or the processor 22, such as via a bus.

Returning to FIG. 2, in an example embodiment, the apparatus 200 includes various means for performing the various functions herein described. These means may comprise one or more of the processor 22, the memory 24, and the communication interface 26. The means of the apparatus 200 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium 24 that is executable by a suitably configured processing device (e.g., the processor 22), or some combination thereof.

In some example embodiments, one or more of the means illustrated in FIG. 2 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 22, the memory 24, and/or the communication interface 26 may be embodied as a chip or chip set. The apparatus 200 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein.

The processor 22 may be embodied as various means, such as circuitry, hardware, a computer program product comprising computer readable program instructions stored on a computer readable medium (e.g., the memory 24) and executed by a processing device (e.g., the processor 22), or some combination thereof and, in some embodiments, is embodied as or otherwise controlled by the processor 22. The processor 22 may further be in communication with one or more of the memory 24, or communication interface 26, such as via a bus.

The processor 22 may be configured to receive a user input from the communication interface 26, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the processor 22 may determine an element/instruction/command that corresponds with a key, or image, displayed on the touch display user interface at the determined position or within a predefined proximity (e.g., within a predefined tolerance range) of the determined position. The processor 22 may be further configured to perform a function or action related to the key corresponding to the element/instruction/command determined by the processor 22 based on the position of the touch or other user input.

In an embodiment in which the apparatus 200 is a mobile device, such as a smartphone, the apparatus 200 can be configured to be operably coupled (e.g., wirelessly coupled) to a network, such as the network 100. The apparatus 200 can comprise means, such as the processor 22 and computer-readable instructions stored on the memory 24, for determining that the apparatus supports a plurality of SIMs, such as SIMs in an active mode. In some embodiments, means can comprise at least one processor and at least one memory including computer program code, the at least one memory and the computer program code configured to, with the at least one processor, cause the apparatus to carry out a method or portions thereof, such as described herein. In some embodiments, the apparatus 200 can further comprise means, such as the processor 22 and/or communications interface 26 (e.g., a transceiver-transmitter) for transmitting a registration message to a network entity, such as the AMF 104 or other components of the network 100. In some embodiments, the registration message can include an indication that the user equipment supports a plurality of SIMs. In some embodiments, the apparatus 200 can further configure means, such as the processor 22 or a receiver, for receiving a number of iterations of a paging occasion associated with a network request for active connection between the apparatus 200 and the network 100 or a network entity thereof. In some embodiments, the apparatus 200 can further comprise means for, in an instance in which the user equipment has accepted paging on another network, transmitting a paging control message to said network 100 or a network entity thereof. In some embodiments, the apparatus 200 can further comprise means for, in an instance in which the apparatus 200 supports a first SIM that is in said active mode with said network entity and the apparatus 200 determines a second SIM will not be placed in said active mode with said network entity, transmitting said paging control message to said network entity. In some embodiments, the registration message can comprise an indication of the number of SIMs supported by the user equipment. In some embodiments, the network entity can be a core network or a radio access network. In some embodiments, the registration message can further comprise a replacement identification for paging at least one of the plurality of SIMs. In some embodiments, the number of iterations of the paging occasion is one and said one paging occasion is associated with said replacement identification. In some embodiments, the apparatus 200 can further comprise means, for negotiating with the network 100 or a network entity thereof regarding appropriate paging occasions. In some embodiments, negotiations between the network 100 and the apparatus 200 can include a negotiation of a "suitable" number of iterations of a paging occasion. In some embodiments, a "suitable" number of iterations of a paging occasion can refer to the number of iterations desired by the UE (e.g., apparatus 200). In other embodiments, a "suitable" number of iterations of a paging occasion can refer to a number of iterations that matches or substantially matches the number of SIMs/USIMs that a UE (e.g., apparatus 200) supports. In some embodiments, a "suitable" number of iterations of a paging occasion can refer to a number of iterations within a range allowed by the network (e.g., network 100). In some embodiments, a "suitable" number of iterations of a paging occasion can refer to a number of iterations computationally determined to be suitable based upon characteristics of the UE, the UE device type (e.g., model, operating system, etc.), the number of SIMs/USIMs supported by the UE, past or predicted future frequency of paging occasions for the particular UE, and/or the like.

In an embodiment in which the apparatus 200 is a mobile device, such as a smartphone, the apparatus 200 can be configured to be operably coupled (e.g., wirelessly coupled) to a network, such as the network 100. The apparatus 200 can comprise means, such as the processor 22 and computer-readable instructions stored on the memory 24, for determining that the apparatus supports a plurality of SIMs, such as SIMs in an active mode. In some embodiments, means can comprise at least one processor and at least one memory including computer program code, the at least one memory and the computer program code configured to, with the at least one processor, cause the apparatus to carry out a method or portions thereof, such as described herein. In some embodiments, the apparatus 200 can further comprise means, such as the processor 22 and/or computer-readable instructions stored on the memory 24, for determining there is a likelihood of a paging occasion conflict. In some embodiments, the apparatus 200 can further comprise means, such as the processor 22 or a transmitter-transponder or the like, for transmitting a registration message to a network entity. In some embodiments, the registration message can comprise an indication that the apparatus supports a plurality of SIMs and a replacement identification for paging at least one of the plurality of SIMs. In some embodiments, the apparatus 200 can further comprise means, such as the processor 22 or the communication interface 26, for receiving a paging occasion from a network entity. In some embodiments, the paging occasion is associated with said replacement identification. In some embodiments, said paging occasion is associated with a network request for data transfer between the network entity and the apparatus. In some embodiments, the apparatus 200 can further comprise means, such as a receiver, for, negotiating with the network entity regarding appropriate paging occasions.

In an embodiment in which the apparatus 200 is a network entity, such as the AMF 104, SMF 106, and/or the like of said network 100, the apparatus 200 can be configured to be operably coupled (e.g., wirelessly coupled) to a user device, such as a mobile phone. The apparatus 200 can comprise means, such as the processor 22 and computer-readable instructions stored on the memory 24, for receiving, from a user equipment, a registration message comprising an indication that the user equipment supports a plurality of SIMs. In some embodiments, means can comprise at least one processor and at least one memory including computer program code with the at least one memory and the computer program code configured to, with the at least one processor, cause the apparatus to carry out a method or portions thereof, such as described herein. In some embodiments, the apparatus 200 can further comprise means, such as the processor 22 and/or communications interface 26 (e.g., a transceiver-transmitter) for sending, to the user equipment, a number of iterations of a paging occasion associated with a network request for active connection between the user equipment and a network entity, such as the AMF 104 or other components of the network 100. In some embodiments, the apparatus 200 can further comprise means, such as a receiver, for receiving, from the user equipment, a paging control message. In some embodiments, the apparatus 200 can further comprise means, such as the processor 22 and/or computer-readable instructions stored at a memory 24, for discontinuing sending said number of iterations of said paging occasion associated with said network request for active connection between the user equipment and the apparatus 200, e.g., a network entity such as the AMF 104, SMF 106, and/or the like. In some embodiments, the registration message further comprises a number of SIMs supported by said user equipment. In some embodiments, the number of iterations of the paging occasion associated with the network request are selected based upon at least the number of SIMs supported by said user equipment.

In an embodiment in which the apparatus 200 is a network entity, such as the AMF 104, SMF 106, and/or the like of said network 100, the apparatus 200 can be configured to be operably coupled (e.g., wirelessly coupled) to a user device, such as a mobile phone. The apparatus 200 can comprise means, such as the processor 22 and computer-readable instructions stored on the memory 24, for receiving, from a user equipment, a registration message comprising an indication that the user equipment supports a plurality of SIMs and a replacement identification for paging at least one of the plurality of SIMs. In some embodiments, means can comprise at least one processor and at least one memory including computer program code, with the at least one memory and the computer program code configured to, with the at least one processor, cause the apparatus to carry out a method or portions thereof, such as described herein. In some embodiments, the apparatus 200 can further comprise means, such as the processor 22 and/or communications interface 26 (e.g., a transceiver-transmitter) for transmitting, to said user equipment, a paging occasion associated with said replacement identification and a network request for data transfer to the user equipment. In some embodiments, the apparatus 200 further comprises means, such as the processor 22, communications interface 26, and computer-readable instructions stored on the memory 24, for negotiating with the user equipment regarding appropriate paging occasions.

In some embodiments, computer-readable instructions can comprise a computer program product comprising a non-transitory computer readable storage medium having program code portions stored thereon, with the program code portions configured, upon execution, to carry out any of the methods or approaches described herein.

Referring now to FIG. 3, a method 300 performed by a user equipment, such as the apparatus 200 is depicted. In some embodiments, the user equipment includes means, such as the processing circuitry 22, the communication interface 26, or the like, operable to carry out the method 300 in part or in full. In some embodiments, the method 300 can comprise determining whether a user equipment supports a plurality of subscriber identification modules (SIMs) in an active mode, said SIMs being operable to facilitate registration of the user equipment with a serving network, at block 301. In some embodiments, the method 300 can further comprise transmitting a registration message to a network entity of said serving network, at block 302. In some embodiments, the method 300 can further comprise, in an instance in which said registration message comprises an indication that the user equipment supports only a single SIM or said registration message does not comprise an indication of a number of SIMs supported by said user equipment, receiving a single instance of a paging occasion from said network entity, at block 303. In some embodiments, the method 300 can further comprise, in an instance in which said registration message comprises an indication that the user equipment supports a plurality of SIMs, receiving a plurality of iterations of a paging occasion associated with a network request for active connection between the user equipment and the network entity, said number of iterations determined based at least in part on the indication that the user equipment supports a plurality of SIMs, at block 304.

Referring now to FIG. 4, a method 400 performed by a user equipment, such as the apparatus 200 is depicted. In some embodiments, the user equipment includes means, such as the processing circuitry 22, the communication interface 26, or the like, operable to carry out the method 400 in part or in full. In some embodiments, the method 300 comprises determining that a user equipment supports a plurality of subscriber identification modules (SIMs) in an active mode, at block 401. In some embodiments, the method 400 further comprises determining there is a likelihood of a paging occasion conflict, at block 402. In some embodiments, the method 400 further comprises transmitting, from said user equipment, a registration message to a network entity on a serving network, said registration message comprising an indication that said user equipment supports a plurality of SIMs and assistance information operable for computing a number of iterations of a paging occasion suitable for said user equipment, at block 403. In some embodiments, the method 400 further comprises negotiating with the network entity regarding said number of iterations of said paging occasion suitable for said user equipment, at block 404. In some embodiments, the method 400 further comprises receiving, at said user equipment, said suitable number of iterations of said paging occasion from said network entity, said paging occasion associated with a network request for transfer of data or a phone call between the network entity and said user equipment, at block 405.

Referring now to FIG. 5, a method 500 performed by a network entity, such as the apparatus 200, is depicted. In some embodiments, the network entity includes means, such as the processing circuitry 22, the communication interface 26, or the like, operable to carry out the method 400 in part or in full. In some embodiments, the method 500 comprises receiving, from a user equipment, a registration message, at block 501. In some embodiments, the method 500 further comprises determining whether said registration message comprises an indication that said user equipment supports a plurality of subscriber identification modules (SIMs), at block 502. In some embodiments, the method 500 further comprises, in an instance in which said registration message comprises an indication that said user equipment supports only a single SIM or said registration message does not comprise an indication of a number of SIMs supported by said user equipment, determining it is suitable to send paging occasions only a single time to said user equipment, at block 503. In some embodiments, the method 500 further comprises, in an instance in which said registration message comprises an indication that said user equipment supports a plurality of SIMs, determining it is suitable to send a plurality of iterations of paging occasions to said user equipment, at block 504. In some embodiments, said registration message further comprises an indication of a number of SIMs supported by said user equipment. In some embodiments, the method can further comprise determining a number of iterations of paging occasions that is suitable to send to said user equipment, based at least in part upon said indication of said number of SIMs supported by said user equipment (not shown in FIG. 5). In some embodiments, the method 500 can further comprise, optionally, receiving, from a user equipment, a paging control message and, upon receiving said paging control message, sending paging occasions to said user equipment according to said paging control message, at block 505. In some embodiments, the method can further comprise, in an instance in which said registration message comprises an indication that said user equipment supports a plurality of SIMs, sending said plurality of iterations of a paging occasion to said user equipment, said paging occasion associated with a network request for transfer of data or a phone call between the network entity and said user equipment (not shown in FIG. 5).

Referring now to FIG. 6, a method 600 performed by a network entity, such as the apparatus 200 is depicted. In some embodiments, the network entity includes means, such as the processing circuitry 22, the communication interface 26, or the like, operable to carry out the method 600 in part or in full. In some embodiments, the method 600 comprises receiving, from a user equipment, a registration message comprising (i) an indication that said user equipment supports a plurality of SIMs and (ii) supporting information, at block 601. In some embodiments, the method 600 further comprises negotiating with said user equipment regarding a suitable number of times for transmitting paging occasions based at least in part upon said indication that said user equipment supports a plurality of SIMs and said supporting information, at block 602. In some embodiments, the method 600 further comprises transmitting, said suitable number of times, a paging occasion associated with a network request, said network request comprising a request for data transfer to said user equipment or a request for transferring a phone call to said user equipment, at block 603.

FIGS. 3-6 illustrate flowcharts depicting methods according to various example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Likewise, various other approaches, methods, network configurations, user equipment configurations, or the like are contemplated. For instance, a method can be provided that comprises receiving, from a user equipment, a registration message comprising an indication that the user equipment supports a plurality of SIMs and assistance information to avoid paging conflicts (e.g. a replacement ID used for computing paging occasions instead of the current UE Identity the network uses for paging occasion computation or any other information that can influence a change of the paging occasion computation algorithm result, as this may evolve over time or change over future radio technologies) for paging one of the plurality of SIMs; and transmitting, to said user equipment, so that a paging occasion computed by using said assistance information to avoid paging conflicts/replacement identification.

In another instance, a method can be provided in which a user equipment determines whether the user equipment supports only one SIM or a plurality of SIMs. In some embodiments, the SIMS are used by the UE to become registered with a serving network. For instance, a UE may become registered with a serving network, using one or more SIMs, according to the 3GPP Technical Specification 21.905, which is hereby incorporated herein by reference in its entirety for all purposes. The method may further comprise transmitting a registration message to a network entity, said registration message comprising an indication that the user equipment supports a plurality of SIMs. The method can further comprise receiving a number of iterations of a paging occasion associated with a network request for active connection between the user equipment and the network entity if this indication is included. In another embodiment, the method can further comprise receiving a number of iterations of a paging occasion associated with a network request for active connection between the user equipment and a network entity if the network entity has not received a stop paging request from the user equipment. In some embodiments, in an instance in which the user equipment has accepted paging or is engaged in connection for data transmission or a voice call on another network, the user equipment can transmit such a paging control message to said network entity, which may cause the network entity to discontinue sending the user equipment paging occurrences. In some embodiments, in an instance in which the user equipment supports a first SIM that is being actively used for a registered connection with a network, and/or where the UE is engaged in connection for data transmission or a voice call with a network entity of said network, the user equipment may transmit such a stop paging request to the network or network entity. In some embodiments, in an instance in which the UE has determined, for whatever reason (e.g., already connected to another network, connected to the same network using a different SIM, or the like), that a second SIM will not be activated and/or used for registration of a connection between the UE and the network or network entity, the UE may transmit such a paging control message to said network entity in the network with which the second SIM is registered.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
   determining whether a user equipment supports a plurality of subscriber identification modules (SIMs) in an active mode, said SIMs being operable to facilitate registration of the user equipment with a serving network;
   transmitting a registration message to a network entity of said serving network;
   in an instance in which said registration message comprises an indication that the user equipment supports only a single SIM or said registration message does not comprise an indication of a number of SIMs supported by said user equipment, receiving a single instance of a paging occasion from said network entity;
   in an instance in which said registration message comprises an indication that the user equipment supports a plurality of SIMs, receiving a plurality of iterations of a paging occasion associated with a network request for active connection between the user equipment and the network entity, said number of iterations determined based at least in part on the indication that the user equipment supports a plurality of SIMs; and
   in an instance in which the user equipment has accepted paging or is engaged in connection for data transmission or a voice call on another network, transmitting a paging control message to said network entity; and
   in an instance in which the user equipment supports a first SIM that is in use in a network, where the UE is engaged in connection for data transmission or a voice call, and where such said network entity is, and the user equipment determines a second SIM will not be used as long as the UE is engaged in connection for data transmission or a voice call in said network, transmitting said paging control message to said network entity of the serving network with which the second SIM is registered.

2. The method of claim 1, wherein said registration message comprises an indication of the number of SIMs supported by the user equipment.

3. The method of claim 1, wherein said network entity is a core network or a radio access network.

4. The method of claim 1, wherein said registration message further comprises assistance information to avoid paging conflicts, wherein the number of iterations of the paging occasion is determined based at least in part on using said assistance information.

5. The method of claim 4, wherein said assistance information comprises a replacement identification that is used by said network entity to compute paging occasions.

6. The method of claim 1, further comprising:
   negotiating with the network entity regarding appropriate paging occasions.

7. An apparatus comprising at least one processor and at least one memory including computer program code, the at least one memory and the computer program code configured to, with the at least one processor, cause the apparatus at least to:
   determine whether said apparatus supports a plurality of subscriber identification modules (SIMs) in an active mode, said SIMs being operable to facilitate registration of said apparatus with a serving network;
   transmit a registration message to a network entity of said serving network;
   in an instance in which said registration message comprises an indication that said apparatus supports only a single SIM or said registration message does not comprise an indication of a number of SIMs supported by said apparatus, receive a single instance of a paging occasion from said network entity;
   in an instance in which said registration message comprises an indication that said apparatus supports a plurality of SIMs, receive a plurality of iterations of a paging occasion associated with a network request for active connection between said apparatus and the network entity, said number of iterations determined based at least in part on the indication that said apparatus supports a plurality of SIMs;
   in an instance in which said apparatus has accepted paging or is engaged in connection for data transmission or a voice call on another network, transmit a paging control message to said network entity; and
   in an instance in which said apparatus supports a first SIM that is in use in a network, where the UE is engaged in connection for data transmission or a voice call, and where such said network entity is, and said apparatus determines a second SIM will not be used as long as long as the UE is engaged in connection for data transmission or a voice call in said network, transmit said paging control message to said network entity of the serving network with which the second SIM is registered.

8. The apparatus of claim 7, wherein said registration message comprises an indication of the number of SIMs supported by said apparatus.

9. The apparatus of claim 7, wherein said network entity is a core network or a radio access network.

10. The apparatus of claim 7, wherein said registration message further comprises assistance information to avoid paging conflicts, wherein the number of iterations of the paging occasion is determined based at least in part on using said assistance information.

11. The apparatus of claim 10, wherein said assistance information comprises a replacement ID that is used by said network entity to compute paging occasions.

12. The apparatus of claim 7, wherein the at least one memory and the computer program code are further configured to, with the at least one processor, cause the apparatus at least to:

negotiate with the network entity regarding appropriate paging occasions.

13. A method comprising:

determining that a user equipment supports a plurality of subscriber identification modules (SIMs) in an active mode;

determining there is a likelihood of a paging occasion conflict;

transmitting, from said user equipment, a registration message to a network entity on a serving network, said registration message comprising an indication that said user equipment supports a plurality of SIMs and assistance information operable for computing a number of iterations of a paging occasion suitable for said user equipment;

negotiating with the network entity regarding said number of iterations of said paging occasion suitable for said user equipment; and receiving, at said user equipment, said suitable number of iterations of said paging occasion from said network entity, said paging occasion associated with a network request for transfer of data or a phone call between the network entity and said user equipment.

14. A method comprising:

receiving, from a user equipment, a registration message;

determining whether said registration message comprises an indication that said user equipment supports a plurality of subscriber identification modules (SIMs);

in an instance in which said registration message comprises an indication that said user equipment supports only a single SIM or said registration message does not comprise an indication of a number of SIMs supported by said user equipment, determining it is suitable to send paging occasions only a single time to said user equipment;

in an instance in which said registration message comprises an indication that said user equipment supports a plurality of SIMs, determining it is suitable to send a plurality of iterations of paging occasions to said user equipment;

receiving, from said user equipment, a paging control message; and upon receiving said paging control message, sending paging occasions to said user equipment according to said paging control message or discontinuing sending paging occasions to said user equipment.

15. The method of claim 14, wherein said registration message further comprises an indication of a number of SIMs supported by said user equipment, the method further comprising:

determining a number of iterations of paging occasions that is suitable to send to said user equipment, based at least in part upon said indication of said number of SIMs supported by said user equipment.

16. The method of claim 14, wherein said registration message further comprises supporting information regarding said SIMs supported by said user equipment.

17. The method of claim 16, wherein said supporting information comprises a replacement identification.

18. The method of claim 14, further comprising:

in an instance in which said registration message comprises an indication that said user equipment supports a plurality of SIMs, sending said plurality of iterations of a paging occasion to said user equipment, said paging occasion associated with a network request for transfer of data or a phone call between a network entity and said user equipment.

19. A method comprising:

receiving, from a user equipment, a registration message comprising (i) an indication that said user equipment supports a plurality of subscriber identification modules (SIMs) and (ii) supporting information;

negotiating with said user equipment regarding a suitable number of times for transmitting paging occasions based at least in part upon said indication that said user equipment supports a plurality of SIMs and said supporting information; and transmitting, said suitable number of times, a paging occasion associated with a network request, said network request comprising a request for data transfer to said user equipment or a request for transferring a phone call to said user equipment.

20. The method of claim 19, wherein said registration message received from said user equipment further comprises an indication of a number of SIMs supported by said user equipment.

* * * * *

UNITED STATES PATENT AND TRADEMARK OFFICE
CERTIFICATE OF CORRECTION

PATENT NO. : 12,317,215 B2 Page 1 of 1
APPLICATION NO. : 17/765033
DATED : May 27, 2025
INVENTOR(S) : Devaki Chandramouli et al.

It is certified that error appears in the above-identified patent and that said Letters Patent is hereby corrected as shown below:

On the Title Page

In Column 2, item (57), Abstract, Line 8, delete "SIMS" and insert -- SIMs --, therefor.

Signed and Sealed this
Twenty-fifth Day of November, 2025

John A. Squires
*Director of the United States Patent and Trademark Office*